April 5, 1927.
M. HOFFMAN
TRANSMISSION BAND OPERATING DEVICE
Filed Oct. 13, 1924
1,623,312
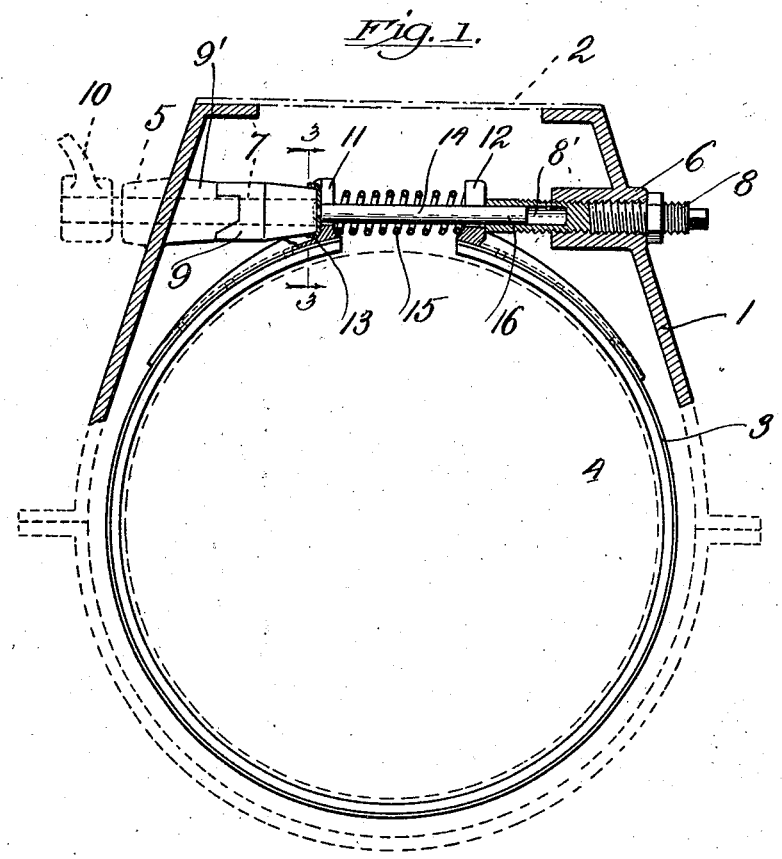
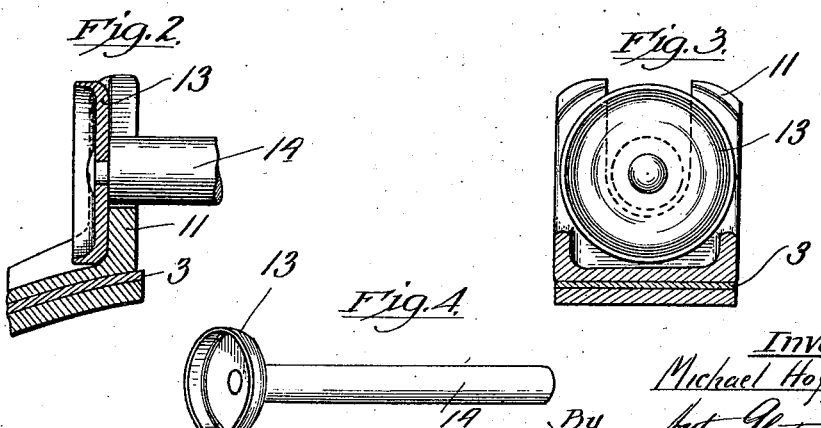

Patented Apr. 5, 1927.

1,623,312

UNITED STATES PATENT OFFICE.

MICHAEL HOFFMAN, OF LOS ANGELES, CALIFORNIA.

TRANSMISSION-BAND-OPERATING DEVICE.

Application filed October 13, 1924. Serial No. 743,260.

This invention relates to an arrangement for facilitating the removal of bands such as are used for clutching purposes in certain classes of transmissions and the object of the invention is to provide a simple, inexpensive and convenient means by which band replacements may be made quickly and without the experience of the skilled.

The main purpose of the present provision is to obviate alterations, fitting and adjustment of old parts and to provide an installation which constitutes an entire and complete substitution of a part or of parts in use ordinarily with transmissions employing bands; which may be set in position without dismantling the housing, and which will be automatically locked and held in position of adjustment.

Other objects will appear hereinafter in connection with the accompanying drawing, which illustrates a selected embodiment of the invention and in which—

Fig. 1 is a sectional front view showing a transmission band as used in connection with an automobile transmission, and means embodying this invention for moving the band.

Fig. 2 is a fragmentary section showing one end of the band and the means co-operating with the band during the operation of same.

Fig. 3 is a section on line 3—3—Fig. 1, and

Fig. 4 is a perspective view of my improvement.

The invention is applicable, as stated, to a certain class of motor vehicle which uses transmission bands, and those parts with which the present invention is associated being of standard, well-known construction, will be referred to only generally.

The transmission housing 1, is provided with a cover 2, removable for the purpose of facilitating access to the band 3, which is contained within the housing 1 and is operable relatively to the gear drum 4, as explained later. The housing is provided with the usual bearings 5 and 6, the former for a cam shaft 7, and the latter for a band engaging and adjusting member 8 having a longitudinal bore 8', for purposes appearing presently. The shaft 7 carries on one end a cam section 9 and at the other end outside the housing 1 an actuating pedal 10, by which the cam section 9, in co-operation with the cam section 9' formed on the bearing 5, is moved in a horizontal direction, for contracting the band 3 and clutching the drum 4. The band 3 referred to is of usual construction and type, and at its respective ends is provided with slotted members 11 and 12, the latter being adjacent to and held against the adjusting member 8. Between the cam section 9 and the member 11 of the band 3 is interposed the cup or cupped member 13 formed on or carried by a shaft 14, this cup or cupped member 13 fitting over the end of said cam section 9 and being securely held in position at this engaging end by the pressure exerted between the slotted members 11 and 12 of the band by a helical spring 15 coiled about said shaft 14 and bearing at one end against the inside of the member 11 of the band 3, and at the other end against the inside of the band member 12, with a constant tendency to force and hold said band ends and members 11 and 12 thereon apart and away from clutching engagement with the drum 4. The other end 16 of said shaft 14 extends into the bore 8' of the member 8, which, when operated in a direction to tighten the band 3, moves relatively to the shaft 14. From the description above, it will be obvious that there is provided a simple means for making easy the quick removal of the spring carrying shaft 15, whereby the permanent joining of the usual construction is converted into a removable one, without disturbing the housing. The operation of the band 3 is entirely identical with the operation followed in other instance. Thus, when the pedal 10 is moved to actuating position, the cam section 9 with the shaft 7 is caused to move in a horizontal plane. This cam section 9 being engaged into the hollow cup portion 13 of the shaft 14, transfers its motion to it, and in turn to the slotted member 11 of the band 3, which, on being moved toward its companion end 12, clutches the gear drum 4. The return to normal, disengaging position of the band and its complementary part is effected by the spring 15.

In order to replace a band or remove it from the housing, the member 8 is disconnected from the bearing 6, and the end 16 of the shaft 14 being free, the shaft 14, may be readily lifted out of the slotted members 11 and 12, without disturbing the housing 1, other than removing the cover 2 thereof.

I am aware that there have been devised and marketed devices comprising substitutions for the shaft usual in the article as manufactured, but they comprise in their essential composition a part or parts of the old elements to be substituted for the new, and hence require alteration, or other mechanical attention, which takes the work of replacement outside the range of the unskilled, but I am not aware of the provision of a single means, for the purposes defined and claimed.

What I claim, is:

1. In a transmission, the combination with a drum, the band surrounding the drum, and having slotted members at its respective ends, a means for actuating one of said slotted members toward the other for tightening the band around said drum, comprising a cam section, a pedal to operate said cam section, and a shaft, extended through the slotted members of said band, said shaft having a cupped end for receiving the end of said cam section and bearing against the outside of one of the slotted members on said band.

2. In a transmission including the drum, the band surrounding the drum and having slotted members at its respective ends, a means for actuating one of the slotted members of said band toward the other to grip the drum, comprising a cam section, a pedal to operate said cam section and a shaft extended through the slotted members of said band, said shaft having a cupped end to fit over the end of said cam section and between said cam section and one of the slotted members.

In testimony whereof I have set my hand.

MICHAEL HOFFMAN.